(12) United States Patent
Hingst et al.

(10) Patent No.: US 11,685,358 B2
(45) Date of Patent: Jun. 27, 2023

(54) CLASSIFYING AN ACTUATION OF AN ELECTRIC PARKING BRAKE OF A VEHICLE

(71) Applicant: Robert Bosch GmbH, Stuttgart (DE)

(72) Inventors: Erica Hingst, Plymouth, MI (US); Kathan Sheth, Farmington Hills, MI (US); Anthony Farrell, Brooklyn, MI (US); Ankit Shah, Canton, MI (US); Sivaraja Velusamy, Northville, MI (US)

(73) Assignee: ROBERT BOSCH GMBH, Stuttgart (DE)

( * ) Notice: Subject to any disclaimer, the term of this patent is extended or adjusted under 35 U.S.C. 154(b) by 357 days.

(21) Appl. No.: 17/132,813

(22) Filed: Dec. 23, 2020

(65) Prior Publication Data

US 2022/0194349 A1 Jun. 23, 2022

(51) Int. Cl.
*B60T 17/22* (2006.01)
*B60Q 9/00* (2006.01)
*B60K 35/00* (2006.01)

(52) U.S. Cl.
CPC ............ *B60T 17/221* (2013.01); *B60K 35/00* (2013.01); *B60Q 9/00* (2013.01); *B60K 2370/11* (2019.05); *B60K 2370/152* (2019.05); *B60T 2201/00* (2013.01); *B60T 2201/02* (2013.01); *B60T 2201/06* (2013.01); *B60T 2210/20* (2013.01); *B60T 2210/30* (2013.01); *B60T 2250/00* (2013.01); *B60T 2250/04* (2013.01)

(58) Field of Classification Search
CPC ............... B60T 17/221; B60T 2201/00; B60T 2201/02; B60T 2201/06; B60T 2210/20; B60T 2210/30; B60T 2250/00; B60T 2250/04; B60T 2270/406; B60T 13/74; B60T 7/22; B60T 2201/10; B60T 2210/32; B60K 35/00; B60K 2370/11; B60K 2370/152; B60Q 9/00
See application file for complete search history.

(56) References Cited

U.S. PATENT DOCUMENTS

| 7,086,503 | B2 | 8/2006 | Miller et al. |
| 7,227,324 | B2 | 6/2007 | Erben et al. |
| 8,386,144 | B2 | 2/2013 | Jackson et al. |

(Continued)

*Primary Examiner* — Yuen Wong
(74) *Attorney, Agent, or Firm* — Michael Best & Friedrich LLP

(57) ABSTRACT

A system and method for classifying an actuation of an electric parking brake of a vehicle is presented. In one example, the system includes a sensor configured to sense a vehicle parameter, an output device, a memory including an electric parking brake usage profile, and an electronic controller configured to receive the electric parking brake usage profile, receive the vehicle parameter, detect an actuation of the electric parking brake, and in response to detecting an actuation of the electric parking brake: determine a reason for the actuation of the electric parking brake, determine an attribute of the vehicle based on the vehicle parameter, classify the actuation of the electric parking brake based on a numerical value of the attribute and/or the reason for the actuation of the electric parking brake, update the electric parking brake usage profile based on the classification, and output the updated parking brake usage profile.

20 Claims, 7 Drawing Sheets

(56) References Cited

U.S. PATENT DOCUMENTS

| | | |
|---|---|---|
| 9,630,601 B2 | 4/2017 | Logan et al. |
| 9,849,867 B2 | 12/2017 | No |
| 2007/0052289 A1 | 3/2007 | Nilsson et al. |
| 2019/0100191 A1 | 4/2019 | Kikkawa |
| 2019/0135257 A1* | 5/2019 | Medinei ................ B60T 13/662 |

* cited by examiner

FIG. 7

700 ELECTRIC PARKING BRAKE USAGE PROFILE — 704

| BRAKE TEMP (°C) | EEPROM ID LEFT ACTUATION | EEPROM ID RIGHT ACTUATION |
|---|---|---|
| 0-100 | NVM_EPB_ACTUATION_COUNT_TEMP_L_01 | NVM_EPB_ACTUATION_COUNT_TEMP_R_01 |
| 101-200 | NVM_EPB_ACTUATION_COUNT_TEMP_L_02 | NVM_EPB_ACTUATION_COUNT_TEMP_R_02 |
| 201-300 | NVM_EPB_ACTUATION_COUNT_TEMP_L_03 | NVM_EPB_ACTUATION_COUNT_TEMP_R_03 |
| 301-400 | NVM_EPB_ACTUATION_COUNT_TEMP_L_04 | NVM_EPB_ACTUATION_COUNT_TEMP_R_04 |
| 401-500 | NVM_EPB_ACTUATION_COUNT_TEMP_L_05 | NVM_EPB_ACTUATION_COUNT_TEMP_R_05 |
| 501-600 | NVM_EPB_ACTUATION_COUNT_TEMP_L_06 | NVM_EPB_ACTUATION_COUNT_TEMP_R_06 |
| 601-700 | NVM_EPB_ACTUATION_COUNT_TEMP_L_07 | NVM_EPB_ACTUATION_COUNT_TEMP_R_07 |

710

| STANDSTILL MANAGEMENT | EEPROM ID LEFT ACTUATION | EEPROM ID RIGHT ACTUATION |
|---|---|---|
| ESS | NVM_EPB_ACTUATION_COUNT_L_ESS | NVM_EPB_ACTUATION_COUNT_R_ESS |
| AVH | NVM_EPB_ACTUATION_COUNT_L_AVH | NVM_EPB_ACTUATION_COUNT_R_AVH |
| ACC | NVM_EPB_ACTUATION_COUNT_L_ACC | NVM_EPB_ACTUATION_COUNT_R_ACC |
| HHC | NVM_EPB_ACTUATION_COUNT_L_HHC | NVM_EPB_ACTUATION_COUNT_R_HHC |

720

| GRADE (%) | EEPROM ID LEFT ACTUATION | EEPROM ID RIGHT ACTUATION |
|---|---|---|
| 0-10 | NVM_EPB_ACTUATION_COUNT_GRADE_L_01 | NVM_EPB_ACTUATION_COUNT_GRADE_R_01 |
| 11-20 | NVM_EPB_ACTUATION_COUNT_GRADE_L_02 | NVM_EPB_ACTUATION_COUNT_GRADE_R_02 |
| 21-30 | NVM_EPB_ACTUATION_COUNT_GRADE_L_03 | NVM_EPB_ACTUATION_COUNT_GRADE_R_03 |
| 31-40 | NVM_EPB_ACTUATION_COUNT_GRADE_L_04 | NVM_EPB_ACTUATION_COUNT_GRADE_R_04 |
| 41-50 | NVM_EPB_ACTUATION_COUNT_GRADE_L_05 | NVM_EPB_ACTUATION_COUNT_GRADE_R_05 |
| 51-60 | NVM_EPB_ACTUATION_COUNT_GRADE_L_06 | NVM_EPB_ACTUATION_COUNT_GRADE_R_06 |

CLASSIFYING AN ACTUATION OF AN ELECTRIC PARKING BRAKE OF A VEHICLE

FIELD

Embodiments relate to systems and methods for classifying an actuation of an electric parking brake of a vehicle.

SUMMARY

Many modern vehicles are equipped with systems capable of performing both automatic and driver-initiated actuations of an electric parking brake. It would be useful for original equipment manufacturers, vehicle owners, maintenance and repair technicians, and others to have a mechanism for tracking and classifying electric parking brake actuations. Such a mechanism is useful for multiple purposes including determining the health of the electric parking brake system and determining electric parking brake actuation trends. For instance, to prevent or reduce damage to a vehicle's braking system, it would be useful to classify electric parking brake actuations and determine an electric parking brake actuation trend that is indicative of excessive brake pad wear.

Embodiments described herein provide, among other things, systems and methods for classifying an actuation of an electric parking brake of a vehicle.

One embodiment provides a system for classifying actuations of an electric parking brake of a vehicle. The system includes a sensor that senses a vehicle parameter and a data store that includes an electric parking brake usage profile. The electric parking brake usage profile includes a history of actuations of the electric parking brake. The system also includes an output device and an electronic controller configured to receive the electric parking brake usage profile, receive a vehicle parameter from the sensor, detect an actuation of the electric parking brake, and in response to detecting an actuation of the electric parking brake determine a reason for the actuation of the electric parking brake. The electronic controller is also configured to determine an attribute of the vehicle based on the vehicle parameter, classify the actuation of the electric parking brake based on at least one selected from the group consisting of a numerical value of the attribute and the reason for the actuation of the electric parking brake. The electronic controller is also configured to update the electric parking brake usage profile based on the classification of the actuation of the electric parking brake, and output the updated electric parking brake usage profile to the output device.

Another embodiment provides a method for classifying actuations of an electric parking brake of a vehicle. The method includes sensing a vehicle parameter with a sensor; receiving, at an electronic controller, an electric parking brake usage profile, the electric parking brake usage profile including a history of actuations of the electric parking brake; receiving, at an electronic controller, a vehicle parameter from the sensor; detecting an actuation of the electric parking brake with the electronic controller, and, in response to detecting an actuation of the electric parking brake, determining, with the electronic controller, a reason for the actuation of the electric parking brake. The method also includes determining, with the electronic controller, an attribute of the vehicle based on the vehicle parameter, and classifying, with the electronic controller, the actuation of the electric parking brake based on at least one selected from the group consisting of a numerical value of the attribute and the reason for the actuation of the electric parking brake. The method also includes updating, with the electronic controller, the electric parking brake usage profile based on the classification of the actuation of the electric parking brake, and outputting, with the electronic controller, the updated electric parking brake usage profile to the output device.

Other aspects, features, and embodiments will become apparent by consideration of the detailed description and accompanying drawings.

BRIEF DESCRIPTION OF THE DRAWINGS

FIG. 7 is an illustrative example of an electric parking brake usage profile according to some embodiments.

DETAILED DESCRIPTION

Before any embodiments are explained in detail, it is to be understood that the disclosure is not intended to be limited in its application to the details of construction and the arrangement of components set forth in the following description or illustrated in the following drawings. Embodiments are capable of other configurations and of being practiced or of being carried out in various ways.

A plurality of hardware and software-based devices, as well as a plurality of different structural components may be used to implement various embodiments. In addition, embodiments may include hardware, software, and electronic components or modules that, for purposes of discussion, may be illustrated and described as if most of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more electronic processors. For example, "control units" and "controllers" described in the specification can include one or more electronic processors, one or more memory modules including non-transitory computer-readable medium, one or more input/output interfaces, one or more application specific integrated circuits (ASICs), and various connections (for example, a system bus) connecting the various components.

For the purposes of this document, the terms "electric parking brake actuation," "actuation of the electric parking brake," or the like, are actions performed by an electric parking brake system to brake one or more wheels of a vehicle to cause a vehicle deceleration or a vehicle holding operation. In one example, an actuation of the electric parking brake is controlled via a driver-initiated operation performed by toggling a switch. In another example, an actuation of the electric parking brake is controlled by an automatic operation initiated by an electronic controller.

For the purposes of this document, the term "attribute" is a condition of a vehicle or a vehicle's components. For example, an attribute is related to a vehicle system such as an odometer value, a brake temperature, a vehicle speed, or the like. In another example, an attribute is related to an environmental condition of the vehicle such as an ambient temperature, a road grade, a time of day, or the like.

Figure 1:
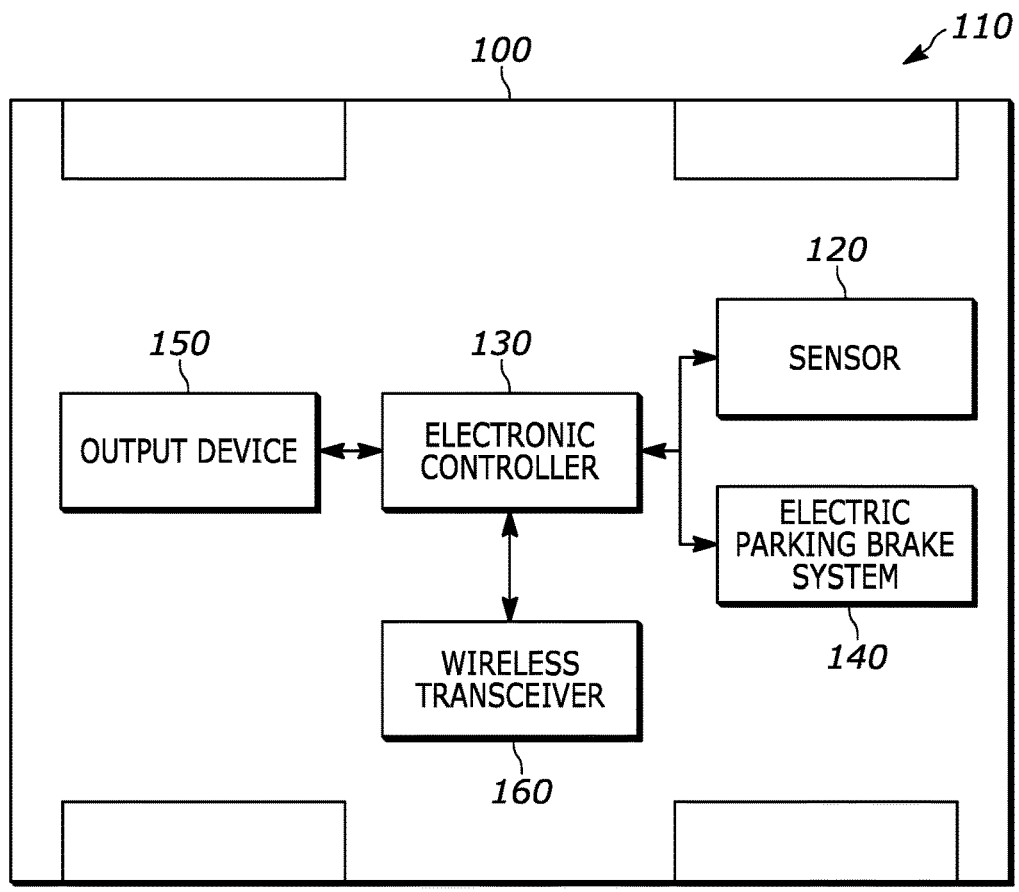
FIG. 1 is a block diagram of a vehicle with a system for classifying actuations of an electric parking brake according to some embodiments.

FIG. 1 illustrates a vehicle 100 equipped with an example of a system 110 for classifying actuations of an electric parking brake of a vehicle. In the example shown, the system 110 includes a sensor 120, an electronic controller 130, an electric parking brake system 140, and an output device 150.

The sensor 120 represent one or more sensors or similar devices that measure or record information regarding the vehicle. In one embodiment, the sensor 120 is a temperature sensor and provides a signal representing a temperature of a brake or an ambient temperature. For example, the temperature signal could be provided on the vehicle bus. In other embodiments, the sensor 120 is an odometer that measures or records a distance traveled by the vehicle. Other information or parameters provided by the sensor includes gear shift information, speed, and road grade. In some embodiments, multiple sensors or an array of sensors is used to record or detect a plurality of parameters (for example, the ones listed in the previous sentence) of the vehicle 100.

The electronic controller 130 is communicatively coupled to the sensor 120 via various wired or wireless connections. In one embodiment, the electronic controller 130 is connected to the sensor 120 via a dedicated wire connection. In other embodiments, the electronic controller 130 is communicatively coupled to the sensor 120 via a shared communication link such as a vehicle communication bus (for example, a controller area network (CAN) bus) or a wireless vehicle network.

The system 110 also includes an electric parking brake system 140. The electric parking brake system 140 is configured to, among other things, control a braking system of the vehicle 100. More particularly, in one example the electric parking brake system 140 controls one more electrically-actuated brakes of one or more wheels of the vehicle 100. The electric parking brake system 140 is further configured to receive a signal from the electronic controller 130. The signal includes a command to actuate the braking system. The electric parking brake system 140 is communicatively coupled to the electronic controller 130 in similar ways to the sensor 120 as discussed above.

In some embodiments, the system 110 also includes an output device 150. In one example, the output device 150 is configured to display an electric parking brake usage profile. In one embodiment, the output device 150 displays a graphical user interface that includes a notification perceptible by an operator of the vehicle 100. In one example, the notification indicates an actuation of the brake and a corresponding vehicle attribute. The notification may also include information for a plurality of historical actuations of the electric parking brake and a plurality of corresponding vehicle attributes. The output device 150 is communicatively coupled to the electronic controller 130 in similar ways to other components discussed above.

In some embodiments, the system 110 also includes a wireless transceiver 160. The electronic controller 130 is configured to send and receive data to a remote location or a remote device via the wireless transceiver 160. The wireless transceiver 160 is communicatively coupled to the electronic controller 130 in similar ways to other components discussed above.

Figure 2:
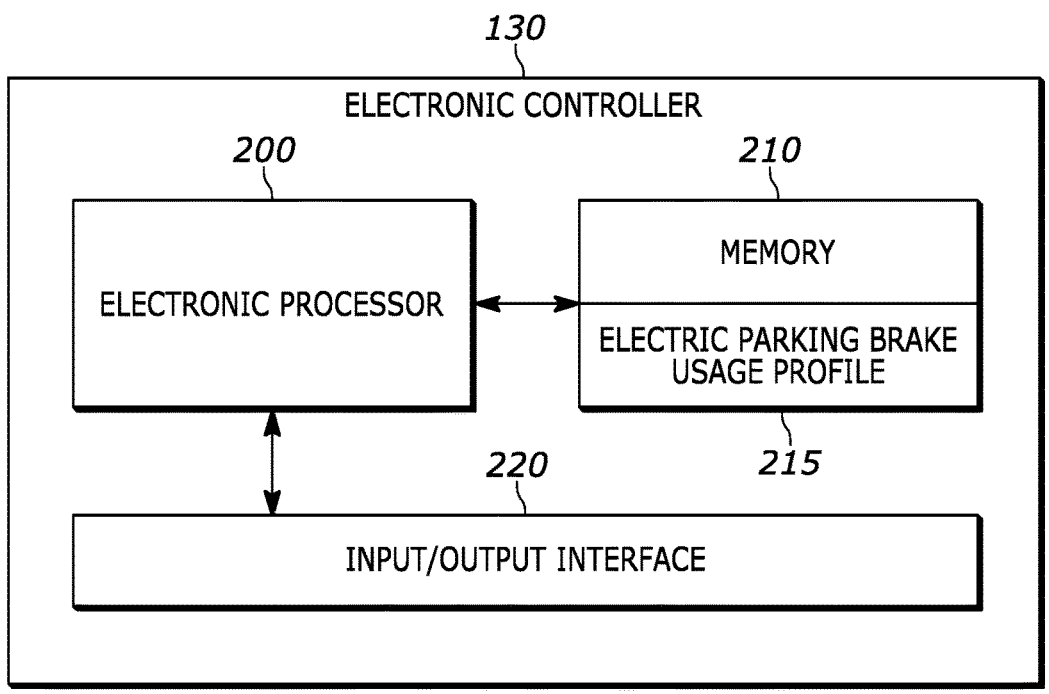
FIG. 2 is an illustrative example of an electronic controller according to some embodiments.

FIG. 2 illustrates the electronic controller 130 in greater detail. The electronic controller 130 includes a plurality of electrical and electronic components that provide power, operation control, and protection to the components and modules within the electronic controller 130. In the example illustrated, the electronic controller 130 includes an electronic processor 200 (such as a programmable electronic microprocessor, microcontroller, or similar device), a memory 210 (for example, non-transitory, machine-readable memory), and an input-output interface 220. The electronic processor 200 is communicatively connected to the memory 210 and the input-output interface 220. The electronic processor 200, in coordination with the memory 210 and the input-output interface 220, is configured to implement, among other things, the methods described herein.

In some embodiments, the memory 210 stores an electric parking brake usage profile 215. The electric parking brake usage profile 215 includes information about historical uses of the electric parking brake, one or more corresponding attributes, and one or more corresponding reasons for the actuation of the electric parking brake. An embodiment of the electric parking brake usage profile 215 is discussed below.

The electronic controller 130, in some embodiments, may be implemented in several independent controllers (for example, programmable electronic control units) each configured to perform specific functions or sub-functions. Additionally, the electronic controller 130 may contain sub-modules that include additional electronic processors, memory, or application-specific integrated circuits (ASICs) for handling input-output functions, processing of signals, and application of the methods listed below. In other embodiments, the electronic controller 130 includes additional, fewer, or different components.

Figure 3:
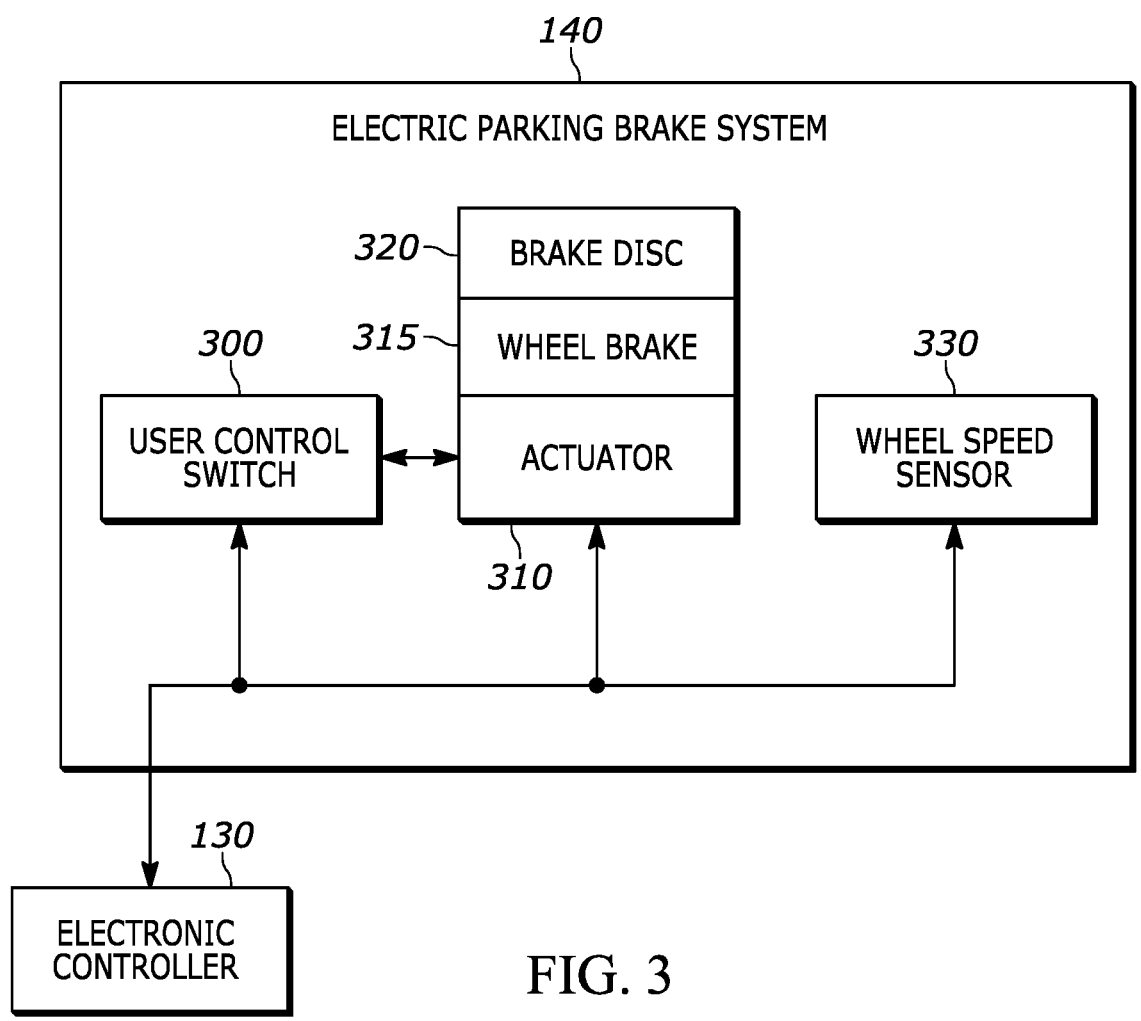
FIG. 3 is an illustrative example of an electronic parking brake system according to some embodiments.

FIG. 3 illustrates the electric parking brake system 140 in greater detail. The electric parking brake system 140 includes a plurality of electrical and electronic components that provide power, operation control, and protection to the components and modules within the electric parking brake system 140. In the example illustrated, the electric parking brake system 140 includes a user control switch 300, an actuator 310, a wheel brake 315 including a brake disc 320, and a wheel speed sensor 330. These elements are described in more detail below.

The electronic controller 130 is communicatively coupled with the user control switch 300, the actuator 310, and the wheel speed sensor 330 via a shared communication link such as a vehicle communication bus (for example, a controller area network (CAN) bus) or a wireless vehicle network. In some embodiments, the user control switch 200, the actuator 310, and the wheel speed sensor 330 are hardwired to the electronic controller 130. The electronic controller 130, in coordination with the user control switch 300, the actuator 310, the brake disc 320 and the wheel speed sensor 330, is configured to implement, among other things, the methods described herein.

In some embodiments, the user control switch 300 is communicatively coupled with the actuator 310 and is configured to generate a signal to control the actuator 310. In some embodiments, the user control switch 300 is a physical switch located in a cabin of the vehicle 100. In another embodiment, the user control switch 300 is implemented in software and controlled via a user interface.

The actuator 310 is a device (for example, an electric motor, linear actuator, or similar device) configured to actuate a vehicle brake. For example, the actuator may cause the calipers of a brake to engage or disengage from the brake disc 320. The actuator 310, in response to commands or signals from the electronic controller 130, performs a vehicle deceleration operation or a vehicle holding function. In some embodiments, the actuator 310 is controlled by a command generated by the electronic controller 130. In some embodiments, the command from the electronic controller 130 is based on a signal generated by the user control switch 300. As noted, in some embodiments, the actuator 310 is configured to engage or disengage a caliper (with, for example brake pads) to the brake disc 320 in order to generate a frictional resistance. In one embodiment, the actuator 310 is integrated in or with a caliper. In another embodiment, the actuator actuates a frictionless braking system such as an electromagnetic braking system or regenerative braking system.

The wheel speed sensor 330 generates a signal indicating a speed of a wheel of the vehicle 100. It should be understood that although the electric parking brake system 140 is illustrated as having one wheel speed sensor 330, most vehicles have one wheel speed sensor for each wheel of the vehicle. Thus, a typical passenger vehicle includes four wheel speed sensors.

The electronic controller 130 is configured to detect an actuation of the actuator 310. In some embodiments, the electronic controller 130 detects an actuation of the actuator 310 based on a signal generated by the user control switch 300. In some embodiments, the electronic controller 130 detects an actuation of the actuator 310 based on a signal generated by the actuator 310. In some embodiments, the electronic controller 130 detects an actuation of the actuator 310 based on a signal generated by the wheel speed sensor 330. In other embodiments, the electronic controller 130 detects an actuation of the actuator 310 based on detecting a command generated by the electronic controller 130 intended to perform an automated vehicle operation.

Figure 4:
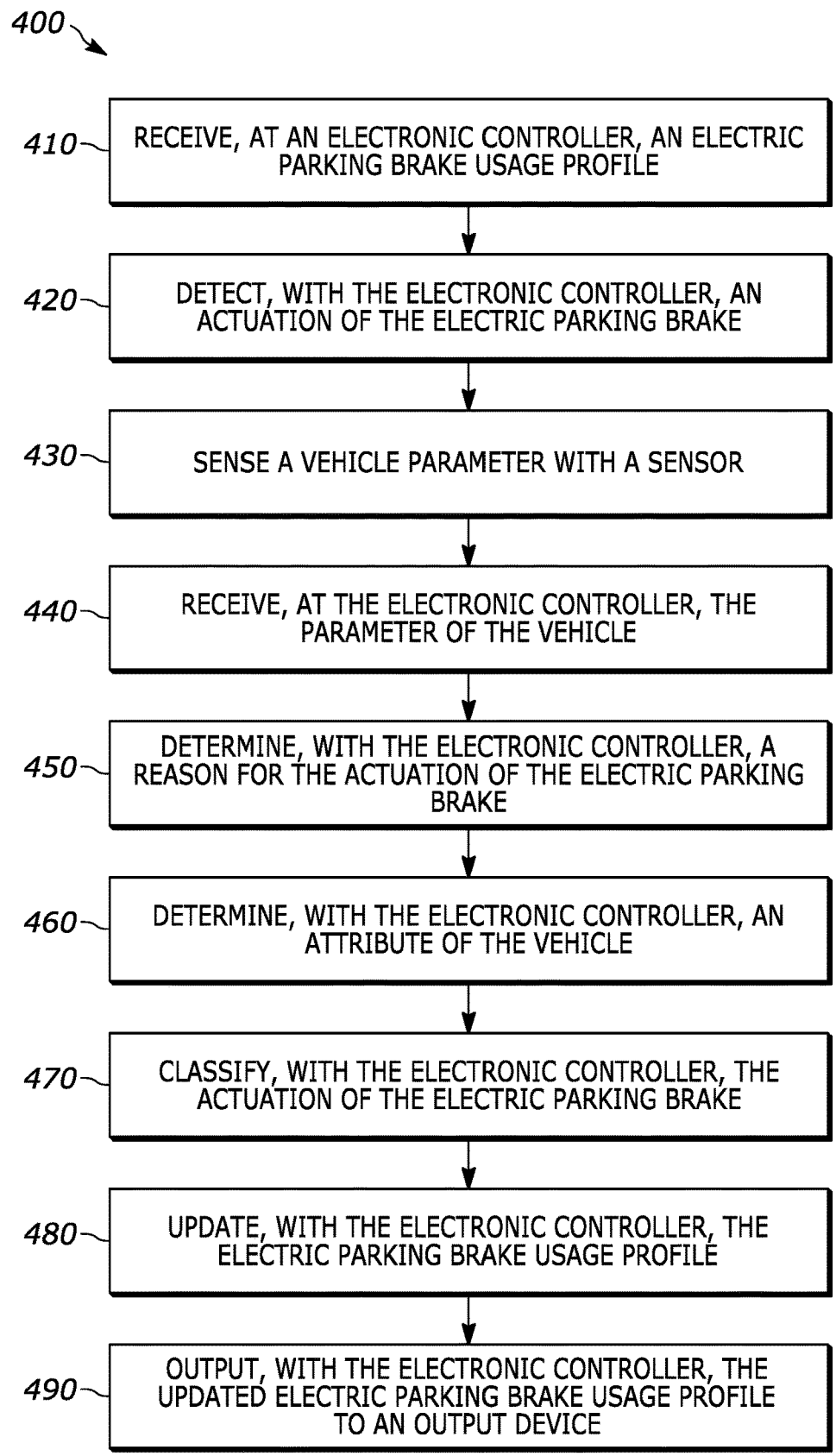
FIG. 4 is a flowchart illustrating a method of classifying actuations of an electric parking brake according to some embodiments.

FIG. 4 is a flowchart illustrating an example method 400 of classifying actuations of an electric parking brake.

At block 410, the electronic controller 130 receives the electric parking brake usage profile 215 from the memory 210. In some embodiments, the electric parking brake usage profile 215 includes a history of electric parking brake actuations of the vehicle 100, the history including one or more reasons for an actuation of the electric parking brake corresponding to each actuation included in the history of electric parking brake actuations and one or more attributes associated with each of actuation included in the history of electric parking brake actuations. In some embodiments, the reason for the actuation of the electric parking brake includes one or more automated vehicle operations in which an actuation of the electric parking brake was performed. Automated vehicle operations may include, for example, an emergency signal system (ESS) operation, an adaptive cruise control (ACC) operation, a stop and go (S&G) operation, a hill hold control (HHC) operation, an automatic vehicle hold (AVH) operation, a roll away re-clamp operation, a hot temperature re-clamp operation, or the like. In some embodiments, the one or more attributes are a condition of the vehicle 100 or a condition of the components of the vehicle 100. For example, an attribute is related to system of the vehicle 100 such as an odometer value, brake temperature, a vehicle speed, or the like. In another example, an attribute is related to an environmental condition of the vehicle 100 such as an ambient temperature, a road grade, a time of day, or the like.

At block 420, the electronic processor 130 detects an actuation of the electric parking brake. While the method process 400 is described in terms of the electronic processor detecting an actuation, it should be understood that the electronic processor makes a determination or evaluation that the electric parking brake has been actuated based on certain information or the occurrence of certain conditions. In some embodiments, the electronic controller 130 determines an actuation of the actuator 310 of the electric parking brake based on a signal generated by the user control switch 300. In some embodiments, the electronic controller 130 determines an actuation of the actuator 310 based on a signal generated by the actuator 310. In other embodiments, the electronic controller 130 determines an actuation of the actuator 310 based on a signal generated by the wheel speed sensor 330. In still other embodiments, the electronic controller 130, in response to receiving certain information regarding the vehicle operating state, makes a decision that actuation of the electric parking brake is warranted. In such embodiments, the electronic controller 130 sends a command to the actuator 310 to actuate the electric parking brake. In such embodiments, the generation of the command is treated as an actual actuation of the actuator 310.

At block 430, the sensor 120 senses a vehicle parameter. The sensor 120 is configured to sense various vehicle related conditions. For example, the vehicle parameter sensed by the sensor 120 may include a speed, a distance, a road grade, a temperature, or the like. The sensor 120 is, in one embodiment, an array of sensors positioned at various points on the vehicle 100 in order to detect a plurality of vehicle parameters. The electronic processor 130 receives the vehicle parameter from the sensor 120 at block 440.

At block 450, the electronic controller 130 determines a reason for the actuation of the electric parking brake. In some embodiments, the electronic controller 130 determines a reason for the actuation of the electric parking brake based on a command generated by the electronic processor 130 indicating an automated vehicle operation. For example, the electronic processor may determine the reason for the actuation of the electric parking brake was due to one or more of an emergency signal system (ESS) operation, an adaptive cruise control (ACC) operation, a stop and go (S&G) operation, a hill hold control (HHC) operation, an automatic vehicle hold (AVH) operation, a roll away re-clamp operation, a hot temperature re-clamp operation, or the like. In some embodiments, the reason for the actuation of the electric parking brake is related to a vehicle operation mode such as a vehicle maintenance mode, a vehicle assembly mode, a vehicle testing mode, or the like. In some embodiments, the electronic controller 130 determines a plurality of reasons for the actuation of the electric parking brake.

At block 460, the electronic processor 130 determines an attribute of the vehicle 100. The electronic processor 130 determines the attribute of the vehicle 100 based on the vehicle parameter sensed by the sensor 120 at the time of the actuation of the electric parking brake. In some embodiments, the attribute is related to an environmental condition of the vehicle 100 such as an ambient temperature, a road grade, a time of day, or the like. In some embodiments, the attribute is related to system of the vehicle 100 such as an odometer value, brake temperature, a vehicle speed, or the like. In some embodiments, the electronic controller 130 determines a plurality of attributes of the vehicle 100 based on a plurality of vehicle parameters sensed by the sensor 120.

At block 470, the electronic controller 130 classifies the actuation of the electric parking brake based on at least one selected from the group consisting of a numerical value of the attribute and the reason for the actuation of the electric parking brake. The numerical value of the attribute may include, for example, an odometer value, a brake temperature value, a time of day, a road grade, or a vehicle speed during an electric parking brake actuation. In one example, the electronic controller 130 classifies the actuation of the electric parking brake based on determining that a brake temperature value sensed by the sensor 120 is between a predetermined range of values. In another example, the electronic controller 130 classifies the actuation of the electric parking brake based on determining that the electric parking brake has been actuated due to a hill hold control (HHC) operation. In another example, the electronic controller 130 may classify the actuation based on determining that the electric parking brake was actuated was due to a hill hold control (HHC) operation and determining the grade of the road was between 10% and 20% when the electric parking brake was actuated. In some embodiments, the electronic controller 130 classifies the actuation of the electric parking brake based on at least one or more numerical values of one or more attributes and one or more reasons for the actuation of the electric parking brake.

At block 480, the electronic controller 130 updates the electric parking brake usage profile 215 based on the classification of the actuation of the electric parking brake. The updated electric parking brake usage profile 215 is an updated version of the history of electric parking brake actuations of the vehicle 100 including the actuation of the electric parking brake classified by the electronic controller 130 at block 470. In some embodiments, the updated electric parking brake usage profile 215 is stored in a data store such as the memory 210. In some embodiments, the electronic controller 130 is configured to send the updated electric parking brake usage profile 215 to a remote location or device via the wireless transceiver 160. For example, the vehicle 100 may be an autonomous vehicle. In this case, the vehicle 100 may be remotely monitored. The electronic controller 130 sends the updated electric parking brake usage profile 215 via the wireless transceiver 160 to the remote location so that a computer system or human operator can monitor electric parking brake usage trends of the vehicle 100.

At block 490, the electronic controller 130 outputs the updated electric parking brake usage profile 215 to the output device 150. In some embodiments, the output device 150 presents a graphical user interface and is located in a cabin of the vehicle 100. In other embodiments, the output device 150 presents a graphical user interface and is co-located or associated with a vehicle diagnostic device used in a vehicle maintenance or repair shop. In some embodiments, the output device 150 may display a visual representation of the updated electric parking brake usage profile 215. For example, the visual representation may be a bar graph, pie chart, line graph, scatter plot, a table, or the like. The visual representation of the electric parking brake usage profile 215 may indicate a total number of electric parking brake actuations according to a plurality of classifications.

Figure 5:
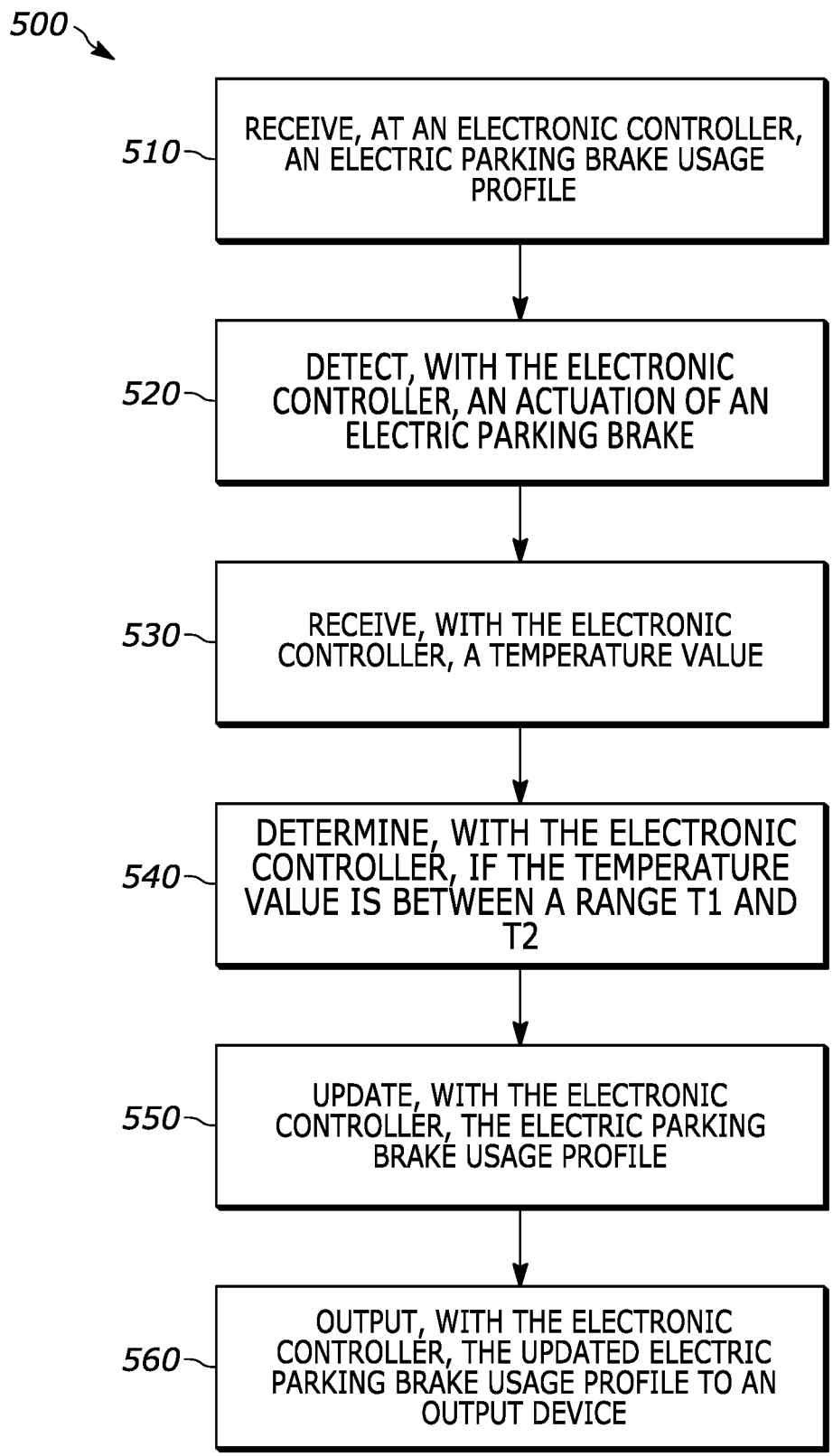
FIG. 5 is a flowchart illustrating a method of classifying actuations of an electric parking brake according to a temperature value range.

FIG. 5 is a flowchart illustrating an example method 500 of classifying actuations of an electric parking brake according to a temperature value range.

At block 510, the electronic controller 130 receives the electric parking brake usage profile 215.

At block 520, the electronic controller 130 detects an actuation of the electric parking brake. The electronic controller 130 detects the actuation of the electric parking brake in a similar manner as described above in FIG. 4.

At block 530, the electronic controller 130 receives a temperature value from the sensor 120. In the embodiment of the method 500, among others, the sensor 120 is a temperature sensor configured to sense a temperature of the brake disc 320 of the electric parking brake system 140. The temperature value received from the sensor 120 indicates a temperature of the brake disc 320 during the actuation of the electric parking brake detected at block 520.

At block 540, the electronic controller 130, determines if the temperature value is between a range T1 and T2. For example, the values T1 and T2 may be 0° C. and 100° C. respectively. In some embodiments, the electronic controller 130 determines that the temperature value is between one of a plurality of predetermined ranges. For example, the electronic controller 130 may determine if the temperature value is between values T1 and T2, T3 and T4, or T5 and T6.

At block 550, the electronic controller 130 updates the electric parking brake usage profile 215 according to the determination made at block 540. For example, at block 540, the electronic controller may have determined that the temperature value is between T1 and T2, and the electric parking brake usage profile 215 may be updated to increment a counter indicating the number of times the electric parking brake has been actuated while the temperature of the brake disc 320 was between T1 and T2.

At block 560, the electronic controller 130 outputs the updated electric parking brake usage profile 215 to an output device. In some embodiments, the output device is a graphical user interface located in the cabin of the vehicle 100. The output may be a visual representation of the updated electric parking brake usage profile 215 displayed via the graphical user interface such as a bar graph, a line graph, a pie chart, a table, or the like. For example, the graphical user interface may display a bar graph indicating the number of times the electric parking brake has been actuated while the brake disc 320 was between the temperature values T1 and T2. In another example, the visual representation of the updated electric parking brake usage profile 215 displays a bar graph indicating the number of times the electric parking has been actuated while the temperature of brake disc 320 was between each one of a plurality of predetermined temperature value ranges. In some embodiments the output is a notification for an operator of the vehicle 100. For example, if, at block 540, it is determined that the temperature value is between T1 and T2, the output may be a notification indicating that actuating the electric parking brake while the temperature value of the brake disc 320 is between T1 and T2 may cause increased wear to the electric parking brake system 140.

Figure 6:
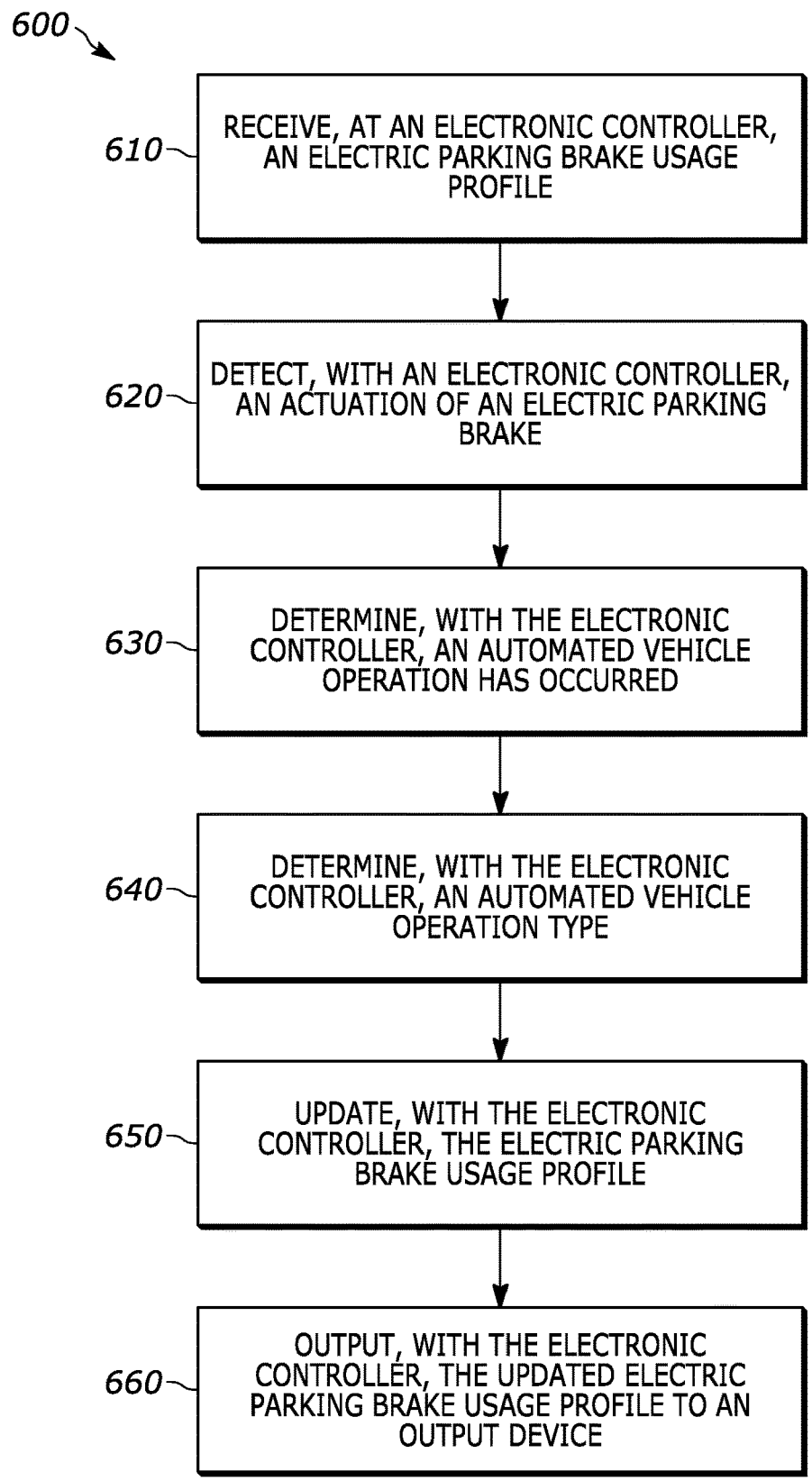
FIG. 6 is a flowchart illustrating a method of classifying actuations of an electric parking brake according to an automated vehicle operation type.

FIG. 6 is a flowchart illustrating a method of classifying actuations of an electric parking brake according to an automated vehicle operation type.

At block 610, the electronic controller 130 receives the electric parking brake usage profile 215.

At block 620, the electronic controller 130 detects an actuation of the electric parking brake. The electronic controller 130 detects the actuation of the electric parking brake in a similar manner as described above with respect to FIG. 4.

At block 630, the electronic controller 130 determines that an automated vehicle operation has occurred. In the embodiment of the method 600, among others, the actuation of the electric parking brake is due to an automated vehicle operation. The electronic controller 130 determines that an automated vehicle operation has occurred based on a command generated by the electronic controller 130 intended to control an automated vehicle operation.

At block 640, the electronic controller 130 determines an automated vehicle operation type. Similar to the determination made at block 630, the electronic controller 130 determines the automated vehicle operation type based on the command generated by the electronic controller 130 intended to control an automated vehicle operation. For example, the electronic controller 130 may additionally be configured to control various automated vehicle operations such as performing a hill hold control (HHC) operation based on one or more vehicle subsystems and sensors. Based on a command generated by the electronic controller 130 configured to control a hill hold control (HHC) operation, the electronic controller 130 may determine that a hill hold control (HHC) operation is the automated vehicle operation type which has caused an actuation of the electric parking brake.

At block 650, the electronic controller 130 updates the electric parking brake usage profile 215. The electric parking brake usage profile 215 is updated according to the automated vehicle operation type determined at block 640. For example, if the automated vehicle operation type is a hill hold control (HHC) operation, the updated electric parking brake usage profile 215 may increment a counter representing the number of times the electric parking brake was actuated due to a hill hold control (HHC) operation.

At block 660, the electronic controller 130 outputs the updated electric parking brake usage profile 215 to an output device. In some embodiments, the output device is a graphical user interface located in the cabin of the vehicle 100. The output may be a visual representation of the updated electric parking brake usage profile 215 displayed via the graphical user interface such as a bar graph, a line graph, a pie chart, a table, or the like. For example, the graphical user interface may display a bar graph indicating the number of times the electric parking brake has been actuated due to a hill hold control (HHC) operation. In another example, the visual representation of the updated electric parking brake usage profile 215 displays a bar graph indicating the number of times the electric parking has been actuated due to a plurality of different automated vehicle operations.

It is to be understood that the method 500 illustrated in FIG. 5 and the method 600 illustrated in FIG. 6 are mere exemplary embodiments of the method 400 illustrated in FIG. 4. One of ordinary skill in the art would understand that although the method 500 describes classifying an actuation of an electric parking brake according to a range of temperature values, it would also be possible to classify an actuation of an electric parking brake according to another range of values such as an odometer value, a vehicle speed, a time, or the like. Accordingly, one of ordinary skill in the art would understand that although the method 600 describes classifying an actuation of an electric parking brake according to a type of automated vehicle operation, it would also be possible to classify an actuation of an electric parking brake according to another vehicle operation categorization such as a type of vehicle operation mode.

FIG. 7 is an illustrative example of an electric parking brake usage profile such as the electric parking brake usage profile 215. The electric parking brake usage profile illustrated in FIG. 7 is a visual representation of data contained in the memory 210. The electric parking brake usage profile 215 includes a history of electric parking brake actuations of the vehicle 100. The history includes one or more reasons for an actuation of the electric parking brake corresponding to each actuation included in the history of parking brake actuations. The history also includes one or more attributes associated with each actuation included in the history of parking brake actuations.

Table 700 contains information about actuations of the electric parking brake according to a brake temperature. Column 702 contains a plurality of ranges of brake temperatures in Celsius. Column 704 contains a plurality variable names identifying a computer memory location that stores a counter value of electric parking brake actuations of the left rear wheel according to one of the plurality of ranges of brake temperatures. Column 706 contains variable names identifying a computer memory location that stores a counter value of electric parking brake actuations of the right rear wheel according to one of the plurality of ranges of brake temperatures. According to some embodiments, the value of a counter of table 700 is incremented based on determining an actuation of the electric parking brake has occurred and determining which range of temperature values a brake temperature sensed by the sensor 120 is between.

Table 710 contains information about actuations of the electric parking brake according to type of standstill management operation. Column 712 contains a plurality of standstill management operation types. Column 714 contains a plurality variable names identifying a computer memory location that stores a counter value of electric parking brake actuations of the left rear wheel according to one of the plurality of standstill management operations. Column 716 contains variable names identifying a computer memory location that stores a counter value of electric parking brake actuations of the right rear wheel according to one of the plurality of standstill management operations. According to some embodiments, the value of a counter of table 710 is incremented based on determining an actuation of the electric parking brake has occurred and determining a type of standstill management operation that cause the actuation of the electric parking brake.

Table 720 contains information about actuations of the electric parking brake according to road grade. Column 722 contains a plurality of ranges of road grade values. Column 724 contains a plurality variable names identifying a computer memory location that stores a counter value of electric parking brake actuations of the left rear wheel according to one of the plurality of ranges road grade values. Column 726 contains variable names identifying a computer memory location that stores a counter value of electric parking brake actuations of the right rear wheel according to one of the plurality of ranges of road grade values. According to some embodiments, the value of a counter of table 720 is incremented based on determining an actuation of the electric parking brake has occurred and determining which range of road grade values a road grade sensed by the sensor 120 is between.

Figure 8:
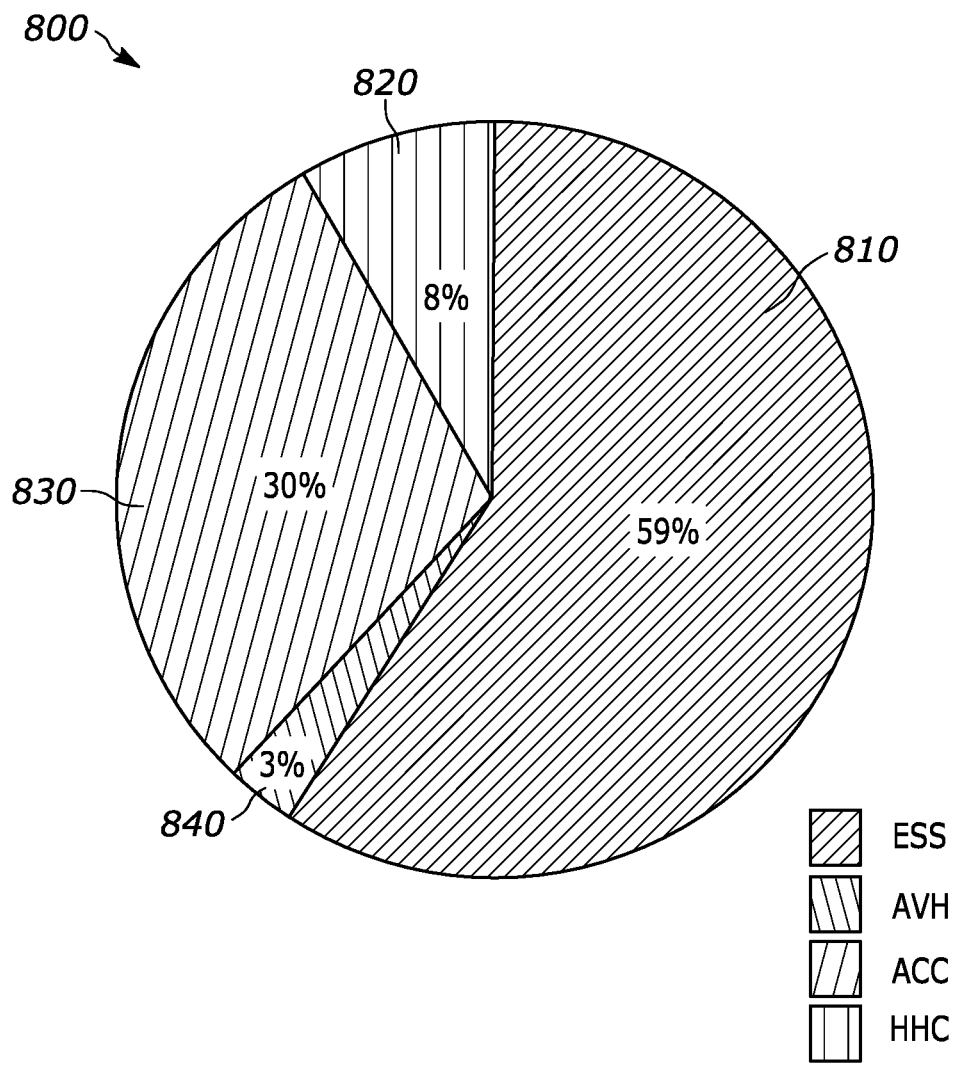
FIG. 8 is a pie chart illustrating an output of the system of FIG. 1 according to some embodiments.

FIG. 8 is an illustrative example of a visual representation 800 that may be displayed on output device 150. The visual representation 800 is a pie chart. In some embodiments, the visual representation 800 is a bar graph, line graph, scatter plot, a table, or the like. The visual representation 800 is divided into a plurality of segments 810, 820, 830, 840. Each segment 810, 820, 830, 840 of the visual representation 800 indicates a classification of an actuation of the electric parking brake according to an automatic vehicle operation. Segment 810 corresponds to a percentage of total actuations of the electric parking brake that were preformed due to an emergency signal system (ESS) operation. Segment 820 corresponds to a percentage of total actuations of the electric parking brake that were preformed due to a hill hold control (HHC) operation. Segment 830 corresponds to a percentage of total actuations of the electric parking brake that were preformed due to an adaptive cruise control (ACC) operation. Segment 840 corresponds to a percentage of total actuations of the electric parking brake that were preformed due to an automatic vehicle hold (AVH) operation. Although the visual representation 800 displays classifications according to various automatic vehicle operations, it is to be understood that other classifications can be represented in the visual representation 800 (for example, classifications according to road grade, ambient temperature, or the like). In some embodiments, the output device 150 presents a graphical user interface and is located in a cabin of the vehicle 100. In other embodiments, the output device 150 presents a graphical user interface and is co-located or associated with a vehicle diagnostic device used in a vehicle maintenance or repair shop.

Various features, advantages, and embodiments are set forth in the following claims.

What is claimed is:

1. A system for classifying actuations of an electric parking brake of a vehicle, the system comprising:
    a sensor that senses a vehicle parameter;
    a memory including an electric parking brake usage profile, the electric parking brake usage profile including a history of actuations of the electric parking brake;
    an output device; and
    an electronic controller configured to
        receive the electric parking brake usage profile,
        receive a vehicle parameter from the sensor,
        detect an actuation of the electric parking brake, and
        in response to detecting an actuation of the electric parking brake
            determine a reason for the actuation of the electric parking brake, wherein the reason for actuation of the electric parking is an automated vehicle operation,
            determine an attribute of the vehicle based on the vehicle parameter,
            classify the actuation of the electric parking brake based on (i) a numerical value of the attribute, (ii) the reason for the actuation of the electric parking brake, or both (i) and (ii),
            update the electric parking brake usage profile based on the classification of the actuation of the electric parking brake, and
            output the updated electric parking brake usage profile to the output device.

2. The system of claim 1, wherein the output of the updated electric parking brake usage profile is one selected from the group consisting of a visual representation of the updated electric parking brake usage profile and a notification.

3. The system of claim 1, wherein the attribute of the vehicle is one selected from the group consisting of an odometer value, a brake temperature value, a health status of a vehicle component, a vehicle gear status, a vehicle movement speed, and a vehicle movement direction.

4. The system of claim 1, wherein the attribute of the vehicle is one selected from the group consisting of an ambient temperature value, a road grade, and a time of day.

5. The system of claim 1, wherein the reason for the actuation of the electric parking brake is one selected from the group consisting of an emergency signal system operation, an adaptive cruise control operation, a stop and go operation, a hill hold control operation, an automatic vehicle hold operation, a roll away re-clamp operation, and a hot temperature re-clamp operation.

6. The system of claim 1, wherein the reason for the actuation of the electric parking brake is one selected from the group consisting of a vehicle maintenance mode, a vehicle assembly mode, and a vehicle testing mode.

7. The system of claim 1, wherein the output device is one of selected from the group consisting of a graphical user interface located in a cabin of the vehicle and a graphical user interface of a vehicle diagnostic tool.

8. The system of claim 1, further comprising a wireless transceiver that is configured to send the updated electric parking brake usage profile to a remote location.

9. The system of claim 1, wherein electronic controller is further configured to store the updated electric parking brake usage profile in the memory.

10. The system of claim 1, wherein the classification of the actuation of the electric parking brake is based on determining when the numerical value of the attribute is between a predetermined range of values.

11. A method for classifying actuations of an electric parking brake of a vehicle, the method comprising:
    sensing a vehicle parameter with a sensor;
    receiving, at an electronic controller, an electric parking brake usage profile, the electric parking brake usage profile including a history of actuations of the electric parking brake;
    receiving, at the electronic controller, a vehicle parameter from the sensor;
    detecting an actuation of the electric parking brake with the electronic controller, and
    in response to detecting an actuation of the electric parking brake:
        determining, with the electronic controller, a reason for the actuation of the electric parking brake, wherein the reason for the actuation of the electric parking is an automated vehicle operation,
        determining, with the electronic controller, an attribute of the vehicle based on the vehicle parameter,
        classifying, with the electronic controller, the actuation of the electric parking brake based on (i) a numerical value of the attribute, (ii) the reason for the actuation of the electric parking brake, or both (i) and (ii),
        updating, with the electronic controller, the electric parking brake usage profile based on the classification of the actuation of the electric parking brake, and
        output, with the electronic controller, the updated electric parking brake usage profile to the output device.

12. The method of claim 11, wherein the output of the updated electric parking brake usage profile is one selected from the group consisting of a visual representation of the updated electric parking brake usage profile and a notification.

13. The method of claim 11, wherein the attribute of the vehicle is one selected from the group consisting of an odometer value, a brake temperature value, a health status of a vehicle component, a vehicle gear status, a vehicle movement speed, and a vehicle movement direction.

14. The method of claim 11, wherein the attribute of the vehicle is one selected from the group consisting of an ambient temperature value, a road grade, and a time of day.

15. The method of claim 11, wherein the reason for the actuation of the electric parking brake is one selected from the group consisting of an emergency signal system operation, an adaptive cruise control operation, a stop and go operation, a hill hold control operation, an automatic vehicle hold operation, a roll away re-clamp operation, and a hot temperature re-clamp operation.

16. The method of claim 11, wherein the reason for the actuation of the electric parking brake is one selected from the group consisting of a vehicle maintenance mode, a vehicle assembly mode, and a vehicle testing mode.

17. The method of claim 11, wherein the output device is one selected from the group consisting of a graphical user interface located in a cabin of the vehicle and a graphical user interface of a vehicle diagnostic tool.

18. The method of claim 11, further comprising sending the updated electric parking brake usage profile to a remote location with a wireless transceiver.

19. The method of claim 11, further comprising storing, with the electronic controller, the updated electric parking brake usage profile in a memory.

20. The method of claim 11, wherein classifying the actuation of the electric parking brake is based on determining when the numerical value of the attribute is between a predetermined range of values.

\* \* \* \* \*